R. WARRINER.
GEARING.
APPLICATION FILED NOV. 6, 1916.

1,273,556.

Patented July 23, 1918.

Inventor:
Robert Warriner,
by his attorney,
Charles N. Groding

UNITED STATES PATENT OFFICE.

ROBERT WARRINER, OF QUINCY, MASSACHUSETTS, ASSIGNOR TO FORE RIVER SHIP-BUILDING CORPORATION, OF QUINCY, MASSACHUSETTS, A CORPORATION OF MASSACHUSETTS.

GEARING.

1,273,556.         Specification of Letters Patent.      Patented July 23, 1918.

Application filed November 6, 1916. Serial No. 129,663.

*To all whom it may concern:*

Be it known that I, ROBERT WARRINER, a citizen of the United States, residing at Quincy, in the county of Norfolk and State of Massachusetts, have invented new and useful Improvements in Gearing, of which the following is a specification.

This invention relates to improvements in gearing and more particularly to what is generally known as double reduction gearing.

The object of the invention is to provide gearing constructed and arranged to operate at a very high rate of speed to transmit power from a highly revolving member to a member which is revolving at a much lower rate of speed, the gears connecting said members together being automatically adjustable during the operation of said gearing to compensate for wear or unevenness in the teeth of the several gears constituting said set, all end thrusts being borne by the driven member of the device.

The invention consists in the combination and arrangement of parts set forth in the following specification and particularly pointed out in the claims.

Referring to the drawings.

Like numerals refer to like parts in both views of the drawings.

Figure 1:
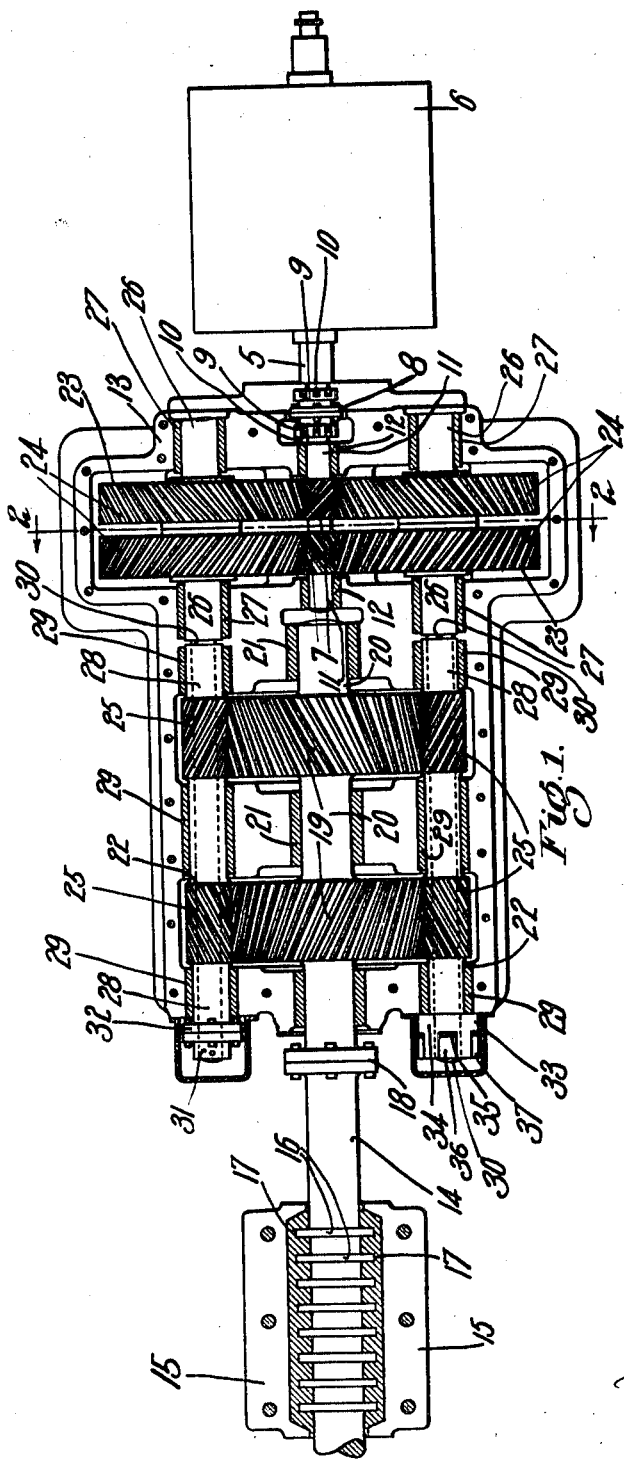
Figure 1 is a plan view of a reduction gear embodying my invention, portion of the casing for said gearing being removed.
Figure 2:
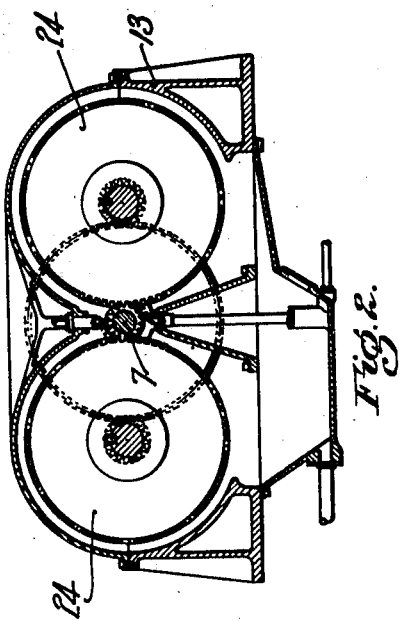
Fig. 2 is a transverse section taken on the line 2—2 of Fig. 1.

In the drawings, 5 is a driving member for the device which, in the present instance, is the shaft of a turbine represented somewhat conventionally at 6. A driving gear 7 of the helical herring bone type but formed in two parts for convenience in manufacture with opposed teeth, is operatively connected with the driving member 5, preferably by means of a coupling 8 having recesses 9 at opposite ends thereof, adapted to receive teeth 10 formed upon the driving member 5 and the gear 7, said teeth being arranged to move lengthwise in the recesses 9 for a limited distance so as to permit the gear 7 to have a limited axial movement relatively to the driving member 5. The gear 7 is journaled at 11, 11 to rotate in bearings 12 provided in the casing 13 inclosing the gearing.

A driven member 14 is journaled to rotate in suitable bearings 15. The driven member 14 is provided with end thrust bearings, in the present instance consisting of a series of ribs 16 engaging correspondingly shaped recesses 17 formed in the bearing 15 and is of the type often employed for receiving the end thrust of a propeller shaft. The driven member is preferably coupled at 18 to a gear 19 which is formed in two parts having opposed helical teeth similar to the teeth of the gear 7.

The gear 19 is provided with journals 20, 20 that rotate in bearings 21 provided in the casing 13. Sufficient clearance is provided at each end of all of the bearings 21 and likewise the bearings 12 to permit a limited axial movement of the gears 19 and 7. The axis of the driven member 14 is preferably arranged to aline with the axis of the driving member 5.

Interposed between the gear 7 and the gear 19 are two sets of gears 22 and 23 placed upon opposite sides of said gears 7 and 19, each set consisting of a gear 24 formed in two parts to correspond and mesh with the gear 7 and a gear 25 also formed in two parts to correspond and mesh with the gear 19. The gears 24 are provided with journals 26 arranged to rotate in bearings 27 in the casing 13.

The gears 25 are each preferably formed upon a sleeve 28, the same being journaled to rotate in bearings 29, 29 also arranged in the casing 13. Attached to one of the journals 26 of each of the gears 24 is a shaft 30 which extends through the sleeve 28 of the gear 25 adjacent thereto. The shaft 30 of the set of gears 22 is provided with a flange 31 secured to the outer end thereof which, in turn, is bolted to a flange 32 at the adjacent end of the sleeve 28, thus causing the shaft 30 and sleeve 28 to rotate in unison.

The shaft 30 of the set of gears 23 likewise extends through and longitudinally of the sleeve 28 adjacent thereto. This shaft is, however, adapted to move longitudinally relatively to said sleeve, permitting the gears 24 and 25 to adjust themselves relatively to each other during the operation of the gearing. To permit said shaft 30 and said sleeve to move in this manner and at the same time prevent any relative rotary motion between the two, a coupling 33 is provided, one member 34 thereof being fastened to the sleeve 28 and having recesses 35 which receive teeth 36 formed upon the member 37, which is attached to the shaft 30, sufficient play being allowed between the teeth 36 and the bottom of the recesses 35 to permit the longitudinal movement hereinbefore mentioned.

With this arrangement of the several gears substantially all of the end thrusts from the various gears will be borne by the thrust bearing 15. The gears 25 of the two sets 22 and 23 will naturally aline themselves with the gear 19 and the gear 24 of the set 22 will be moved in one direction or the other along its axis to correspond with the movement of the gear 25 of said set in assuming its correct alinement for the reason that said gears 24 and 25 are mounted in fixed relation to each other.

Any movement of the gear 24 of the set 22 longitudinally of its axis will effect a similar movement of the pinion 7 which will naturally assume its proper alinement with the gear 24, such a movement of said pinion being permitted by the coupling 8.

It will therefore be seen that with the provision for relative movement between the gears 24 and 25 of the set 23 there will be no binding between any of the gears of the device, as they will all naturally and automatically assume their correct alining positions.

Having thus described my invention what I claim and desire by Letters Patent to secure is:

1. A device of the class described having, in combination, a driving member, a gear coaxially mounted with said driving member and having axial movement relatively thereto, a driven member, a gear fast upon said driven member, an end thrust bearing adapted to prevent endwise movement of said driven member, two sets of gears, each interposed between the gears of said driving and driven members, and means adapted to provide for a relative axial movement between the gears of one of said sets, whereby all of the gears of said device may automatically adjust themselves relatively to the driven member during the operations thereof.

2. A reduction gear having, in combination, a driving member, a helical gear rotatable with said driving member, means adapted to provide for a limited axial movement of said gear, a driven member coaxially disposed with said driving member, a helical gear fast upon said driven member, an end thrust bearing for said driven member, a pair of coaxially disposed helical gears interposed between the gears of said driving and driven members, and means adapted to provide for a limited axial movement of the gears of one of said pairs relatively to each other.

3. A reduction gear having, in combination, a driving member, a helical gear rotatable with said driving member, means adapted to provide for a limited axial movement of said gear, a driven member coaxially disposed with said driving member, a helical gear fast upon said driven member, an end thrust bearing for said driven member, a pair of coaxially disposed helical gears interposed between the gears of said driving and driven members, said last named gears being arranged in fixed relation to each other, a second pair of coaxially disposed helical gears interposed between the gears of said driving and driven members, and a coupling interposed between the gears of said second pair adapted to provide for a limited axial movement of said gears relatively to each other.

In testimony whereof I have hereunto set my hand in presence of two subscribing witnesses.

ROBERT WARRINER. [L. S.]

Witnesses:
NELLIE G. LANE,
MARGARET C. CONDRICK.